United States Patent
Otomi et al.

(10) Patent No.: US 10,737,663 B2
(45) Date of Patent: Aug. 11, 2020

(54) EXTRANEOUS-MATTER REMOVING APPARATUS

(71) Applicant: FUJITSU TEN LIMITED, Kobe-shi, Hyogo (JP)

(72) Inventors: Masashi Otomi, Kobe (JP); Masahiro Koharazawa, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 240 days.

(21) Appl. No.: 15/730,326

(22) Filed: Oct. 11, 2017

(65) Prior Publication Data

US 2018/0141523 A1 May 24, 2018

(30) Foreign Application Priority Data

Nov. 22, 2016 (JP) ................. 2016-226956

(51) Int. Cl.
| | |
|---|---|
| *B60S 1/56* | (2006.01) |
| *B60R 1/00* | (2006.01) |
| *B60S 1/54* | (2006.01) |
| *B60S 1/48* | (2006.01) |
| *B60S 1/58* | (2006.01) |

(52) U.S. Cl.
CPC ............... *B60S 1/54* (2013.01); *B60S 1/486* (2013.01); *B60S 1/548* (2013.01); *B60S 1/56* (2013.01); *B60S 1/583* (2013.01); *B60R 1/00* (2013.01); *B60R 2300/8026* (2013.01)

(58) Field of Classification Search
CPC .... B60S 1/02; B60S 1/04; B60S 1/485; B60S 1/566; B60S 1/56; B60S 1/583; B60S 1/54; B60S 1/603; B60S 1/0848; B60S 1/542; G01N 21/15; G01N 2021/151; G01N 2021/152; G02B 27/0006
See application file for complete search history.

(56) References Cited

U.S. PATENT DOCUMENTS

| | | | |
|---|---|---|---|
| 2012/0117745 A1* | 5/2012 | Hattori | ................. B60S 1/54 15/250.01 |
| 2015/0329083 A1* | 11/2015 | Kiyohara | ............. H04N 5/2171 348/148 |
| 2017/0182980 A1* | 6/2017 | Davies | ................... B60S 1/54 |
| 2018/0015908 A1* | 1/2018 | Rice | ................... G05D 1/0088 |

FOREIGN PATENT DOCUMENTS

| | | |
|---|---|---|
| JP | 2006-096190 A | 4/2006 |
| JP | 2013-080177 A | 5/2013 |
| JP | 2014-027539 A | 2/2014 |
| JP | 2014-037239 A | 2/2014 |
| JP | 2016-064397 A | 4/2016 |

\* cited by examiner

*Primary Examiner* — Monica S Carter
*Assistant Examiner* — Abbie E Quann
(74) *Attorney, Agent, or Firm* — Oliff PLC

(57) ABSTRACT

An extraneous-matter removing apparatus according to an embodiment includes a connector, a detector, and a removal unit. The connector is connected with a branch wire branching from a camera wire. The camera wire transmits a start-up signal for starting up a camera provided outside of a vehicle. The detector detects the start-up signal flowing through the branch wire connected with the connector. The removal unit performs, when the detector detects the start-up signal, a removing operation of an extraneous matter attached to the camera.

6 Claims, 9 Drawing Sheets

EXTRANEOUS-MATTER REMOVING APPARATUS

CROSS-REFERENCE TO RELATED APPLICATION

This application is based upon and claims the benefit of priority of the prior Japanese Patent Application No. 2016-226956, filed on Nov. 22, 2016, the entire contents of which are incorporated herein by reference.

FIELD

The embodiments discussed herein are directed to an extraneous-matter removing apparatus.

BACKGROUND

Conventionally, there is known a camera that is provided in a vehicle so as to capture an image of the vicinity of the vehicle, and the image captured by this camera is provided to a driver.

An extraneous matter such as a water droplet, a snowflake, and a stain adheres in some cases to a lens of the camera. Therefore, there exists an extraneous-matter removing apparatus that removes an extraneous matter attached to the lens of the camera in response to a user operation (see Japanese Laid-open Patent Publication No. 2014-037239, for example).

However, in the above conventional technology, a user is to operate a switch etc. in order to operate the extraneous-matter removing apparatus. Therefore, the conventional technology has room for improvement in improving convenience of a user.

SUMMARY

An extraneous-matter removing apparatus according to an embodiment includes a connector, a detector, and a removal unit. The connector is connected with a branch wire branching from a camera wire. The camera wire transmits a start-up signal for starting up a camera provided outside of a vehicle. The detector detects the start-up signal flowing through the branch wire connected with the connector. The removal unit performs, when the detector detects the start-up signal, a removing operation of an extraneous matter attached to the camera.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF EMBODIMENTS

Hereinafter, exemplary embodiments of an extraneous-matter removing apparatus disclosed in the present application will be described in detail with reference to the accompanying drawings. The present disclosure is not limited to the following embodiments.

First Embodiment

Figure 1:
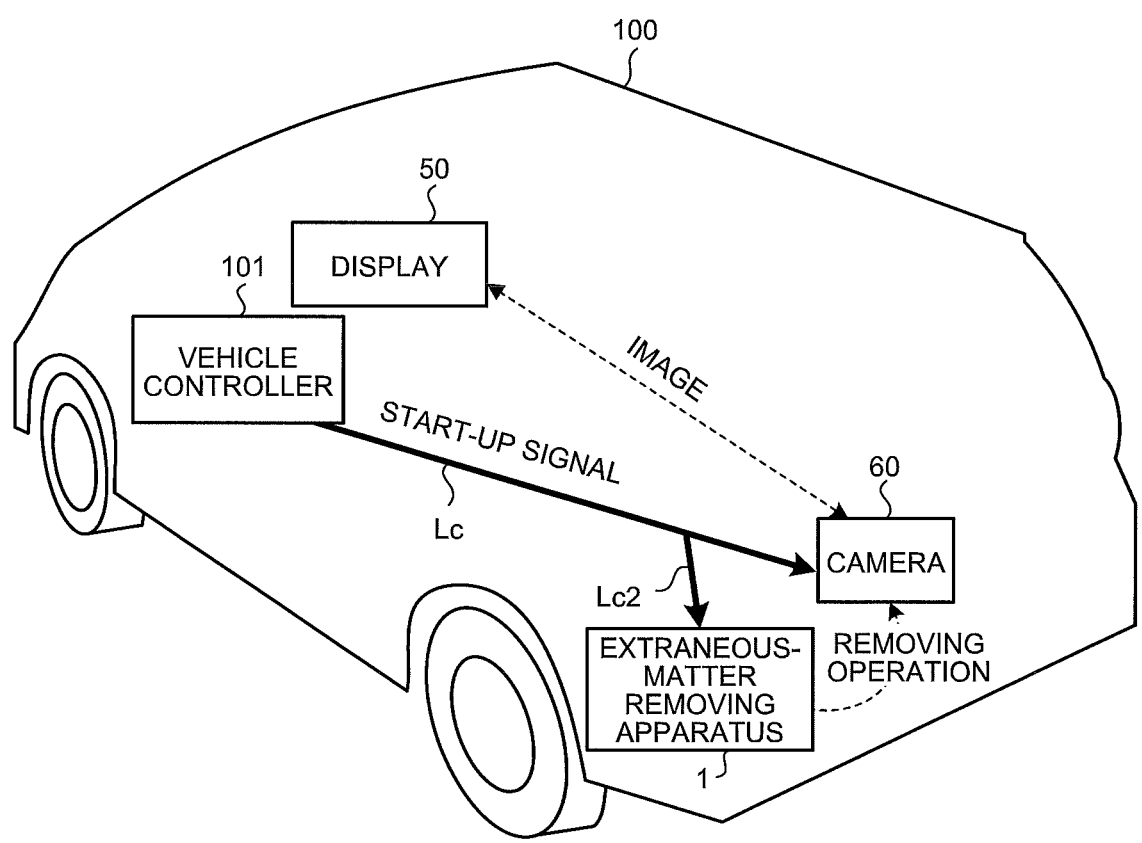
FIG. 1 is a diagram illustrating the outline of an extraneous-matter removing apparatus according to a first embodiment.

First, the outline of an extraneous-matter removing apparatus 1 according to the embodiment will be explained with reference to FIG. 1. FIG. 1 is a diagram illustrating the outline of the extraneous-matter removing apparatus 1.

As illustrated in FIG. 1, the extraneous-matter removing apparatus 1 is provided in a vehicle 100. The extraneous-matter removing apparatus 1 removes an extraneous matter that is attached to a lens 61 (see FIG. 3) of a camera 60 provided in the vehicle 100. Therefore, the extraneous-matter removing apparatus 1 is arranged near the camera 60.

The camera 60 is a back camera that captures the rear of the vehicle 100, for example. The camera 60 is started when a start-up signal Sc is input thereto from a vehicle controller 101, and captures a predetermined area. The start-up signal Sc is input from the vehicle controller 101 to the camera 60 through a camera wire Lc.

An image captured by the camera 60 is output to a display 50 illustrated in FIG. 1 through the camera wire Lc, for example, and is provided to a user. The camera 60 is attached to the outside of the vehicle 100 such as a back door. Therefore, there exists in some cases a case where an extraneous matter including a raindrop, a snowflake, a stain, etc. is attached to the lens 61 of the camera 60.

In the above conventional technology, when a user recognizes an image displayed on the display 50 and operates a switch, an operation for removing an extraneous matter is performed in response to this operation.

In other words, in the conventional technology, a user recognizes presence and absence of an extraneous matter from the image so as to perform a removing operation, and thus the image on which the extraneous matter is captured is once to be provided to a user. In other words, a user is to recognize the image to perform the operation on the switch, furthermore, the image on which the extraneous matter is captured is to be provided to the user, and thus the conventional technology has room for improvement in improving convenience of the user.

Therefore, the extraneous-matter removing apparatus 1 according to the embodiment performs an operation for removing an extraneous matter attached to the lens 61 at a timing when the camera 60 is started up to be able to improve convenience of the user.

Specifically, when detecting the start-up signal Sc flowing through a camera branch wire Lc2 that is a branch wire branching from the camera wire Lc, the extraneous-matter removing apparatus 1 performs the operation for removing an extraneous matter attached to the lens 61 of the camera 60. When the camera 60 is attached to the outside of the back door, the camera branch wire Lc2 branches from the camera wire Lc inside the back door.

Thus, a clear image after removal of the extraneous matter is displayed on the display 50. Therefore, a user is not to perform an additional operation such as a switch operation.

Therefore, by employing the extraneous-matter removing apparatus 1 according to the present embodiment, it is possible to improve convenience of the user. Meanwhile, the extraneous-matter removing apparatus 1 is in some cases additionally provided to the camera 60 as an option item, for example.

Therefore, as described above, the extraneous-matter removing apparatus 1 is connected with the camera branch wire Lc2 branching from the camera wire Lc, and the start-up signal Sc flowing through the camera branch wire Lc2 is detected so as to perform the removing operation. In other words, in arrangement of the extraneous-matter removing apparatus 1, a wiring operation of an additional wire from the vehicle controller 101 to the extraneous-matter removing apparatus 1 is able to be omitted.

In other words, the extraneous-matter removing apparatus 1 is able to utilize a preliminary-wired existing wire. Therefore, an installation time interval of the extraneous-matter removing apparatus 1 is able to be shortened and an installation cost is able to be cut. In other words, not only the convenience of the user, but also convenience of an installation worker is able to be improved.

The case is explained where the camera 60 is a back camera for capturing the rear of the vehicle 100, not limited thereto. The camera 60 may be a camera for capturing an area other than the rear, such as the front, the right, and the left of the vehicle 100.

Meanwhile, there exists a case where an extraneous matter is attached to the lens 61 after the camera 60 is started up but the extraneous matter is not removed by one removing operation. Therefore, the extraneous-matter removing apparatus 1 may perform the removing operation in response to the user operation. Details of this point will be mentioned later with reference to FIG. 4.

The extraneous-matter removing apparatus 1 may detect rising of the start-up signal Sc and may perform the removing operation. Details of this point will be also mentioned later with reference to FIG. 4.

Figure 2:
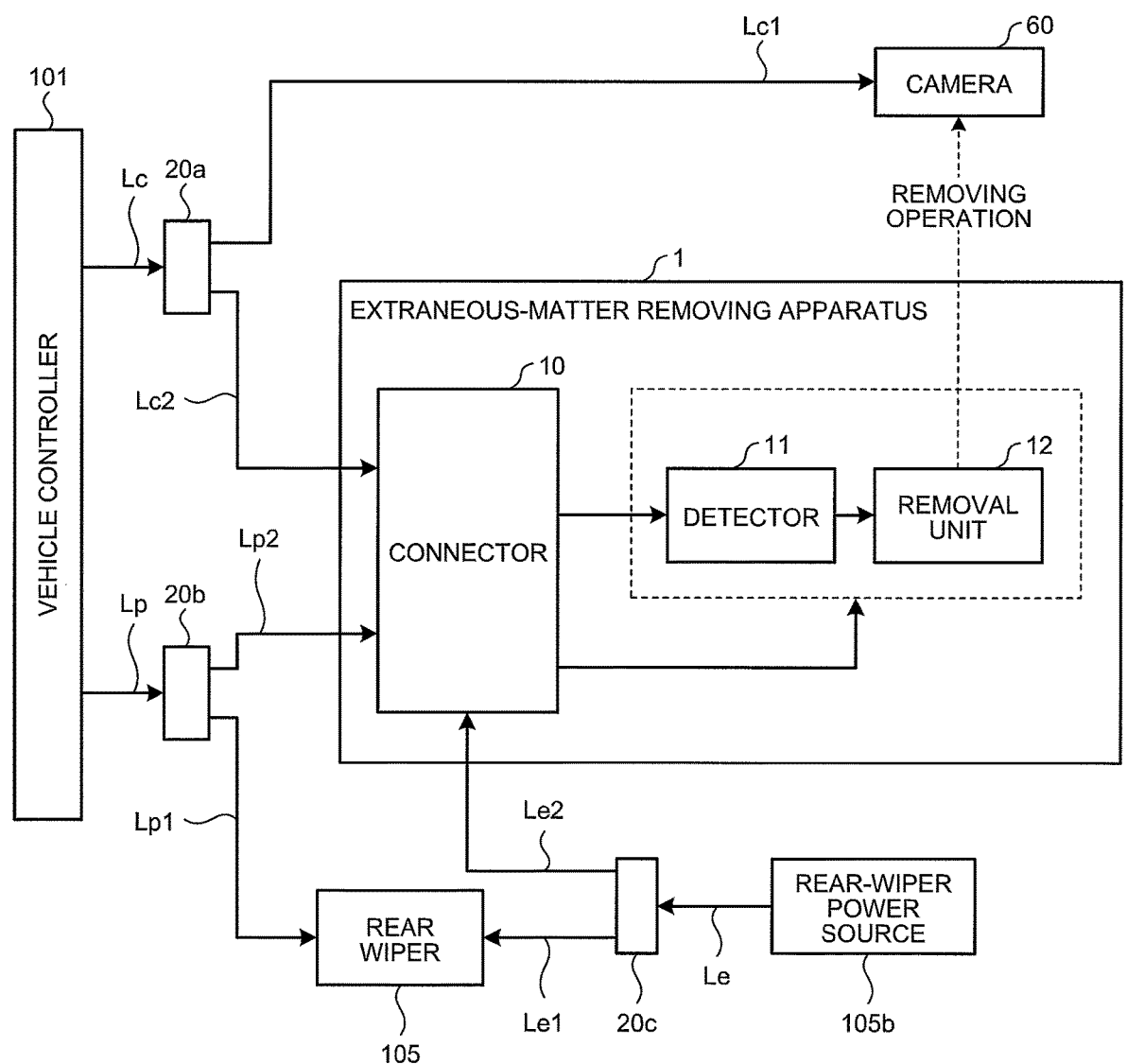
FIG. 2 is a block diagram illustrating the extraneous-matter removing apparatus according to the first embodiment.

Next, a configuration of the extraneous-matter removing apparatus 1 according to the first embodiment will be explained with reference to FIG. 2. FIG. 2 is a block diagram illustrating the extraneous-matter removing apparatus 1 according to the first embodiment.

In FIG. 2, the camera 60, the vehicle controller 101, a rear wiper 105, etc. are illustrated in addition to the extraneous-matter removing apparatus 1. The vehicle controller 101 outputs a signal for controlling the camera 60 and the rear wiper 105 in response to a driving operation of a user, for example.

For example, when a user changes a shift lever (not illustrated) of the vehicle 100 into "reverse", the vehicle controller 101 acquires a reverse signal from a shift sensor (not illustrated). The vehicle controller 101 outputs the start-up signal Sc to the camera 60. For example, the start-up signal Sc has an operation voltage for operating the camera 60.

In this case, the reverse signal is input from the shift sensor also to the display 50 illustrated in FIG. 1. When acquiring this reverse signal, the display 50 displays an image captured by the camera 60 instead of a navigation image input from a navigation apparatus (not illustrated).

In other words, when a shift gear of the vehicle 100 is in "reverse", an image captured by the camera 60 is to be displayed on the display 50.

When a user turns on a rear-wiper switch (not illustrated), the vehicle controller 101 outputs an operation signal Sp to the rear wiper 105. The operation signal Sp includes 15 A of current, for example.

The camera 60 includes a capturing element such as a Charge Coupled Device (CCD) and a Complementary Metal Oxide Semiconductor (CMOS) so as to capture a predetermined area in the rear of the vehicle 100, for example.

When the start-up signal Sc (namely, operation voltage) is input from the vehicle controller 101, the camera 60 is started up. Next, the camera 60 captures a predetermined area and outputs a captured image to the display 50 illustrated in FIG. 1.

The start-up signal Sc is input to the camera 60 through the camera wire Lc, a connector 20a, and a camera branch wire Lc1. The operation voltage is not supplied during an interval in which an output of the start-up signal Sc from the vehicle controller 101 is stopped, and thus the camera 60 is in a stop state.

When the operation signal Sp is input from the vehicle controller 101, the rear wiper 105 performs an operation for removing a droplet etc. attached to a rear window of the vehicle 100. The operation signal Sp is input to the rear wiper 105 through a wiper wire Lp, a connector 20b, and a wiper branch wire Lp1.

The rear wiper 105 is operated by electric power supplied from a rear-wiper power source 105b through a power-supply wire Le, a connector 20c, and a power-source branch wire Le1.

As illustrated in FIG. 2, the camera wire Lc and the wiper wire Lp wired from the vehicle controller 101 respectively branch in the connector 20a and the connector 20b, and are connected to the extraneous-matter removing apparatus 1.

In other words, the start-up signal Sc and the operation signal Sp output from the vehicle controller 101 is to be input to the extraneous-matter removing apparatus 1.

The power-supply wire Le wired from the rear-wiper power source 105b branches in the connector 20c and is connected to the extraneous-matter removing apparatus 1. In other words, the extraneous-matter removing apparatus 1 is operated by electric power supplied from the rear-wiper power source 105b.

The connector 20a, the connector 20b, and the connector 20c are arranged in the back door in a manufacturing stage of the vehicle 100, for example.

Therefore, all of the wires to be connected to the extraneous-matter removing apparatus 1 are able to be used by branching in one or more connectors arranged in the back door. In other words, there exists no necessity for newly wiring a wire into the back door in arranging the extraneous-matter removing apparatus 1.

Thus, it is possible to facilitate installation of the extraneous-matter removing apparatus 1 and to cut the installation cost.

The extraneous-matter removing apparatus 1 includes a connector 10, a detector 11, and a removal unit 12. The camera branch wire Lc2 branching from the camera wire Lc and a second branch wire (hereinafter, may be referred to as "wiper branch wire Lp2") branching from the wiper wire Lp are connected with the connector 10.

The connector 10 transmits, to the detector 11, the start-up signal Sc flowing through the camera branch wire Lc2 and the operation signal Sp flowing through the wiper branch wire Lp2 as they are.

A power-source branch wire Le2 branching from the power-supply wire Le is connected to the connector 10, for example. The connector 10 supplies electric power supplied from the rear-wiper power source 105b to the detector 11 and the removal unit 12.

Thus, the extraneous-matter removing apparatus 1 is operated by utilizing the power source preliminary installed in the back door. Therefore, it is possible to reduce the installation cost because there exists no necessity for providing a new power source.

For example, electric power is always supplied to the detector 11 and the removal unit 12 from the rear-wiper power source 105b. Therefore, when the detector 11 detects the start-up signal Sc for starting up the camera 60, it is possible to rapidly perform the removing operation.

The extraneous-matter removing apparatus 1 may use, instead of the rear-wiper power source 105b, another power source for a brake lamp or a backup lamp preliminary installed in the back door. Moreover, a dry-cell battery may be used as a power supplying source of the extraneous-matter removing apparatus 1.

The detector 11 detects the start-up signal Sc for the camera 60 and the operation signal Sp for the rear wiper 105 that are respectively flow through the camera branch wire Lc2 and the wiper branch wire Lp2 connected with the connector 10.

The detector 11 generates, in response to the detected signal, a removal signal Sr for instructing to perform the removing operation, and outputs the generated removal signal Sr to the removal unit 12. Details of processes to be executed by the detector 11 will be mentioned later with reference to FIG. 4.

As to be mentioned in the following, a case will be explained in which the detector 11 of the extraneous-matter removing apparatus 1 according to the first embodiment outputs the removal signal Sr to the removal unit 12 on the basis of the start-up signal Sc for the camera 60 and the operation signal Sp for the rear wiper 105, however, not limited thereto.

For example, the detector 11 may detect, instead of the operation signal Sp for the rear wiper 105, an operation signal for the backup lamp or the brake lamp, and outputs the removal signal Sr to the removal unit 12.

When the above removal signal Sr is input from the detector 11, the removal unit 12 performs the operation for removing an extraneous matter attached to the camera 60. A specific example of the removing operation to be performed by the removal unit 12 will be mentioned later with reference to FIG. 3.

Next, the removing operation to be performed by the removal unit 12 will be explained with reference to FIG. 3.

Figure 3:
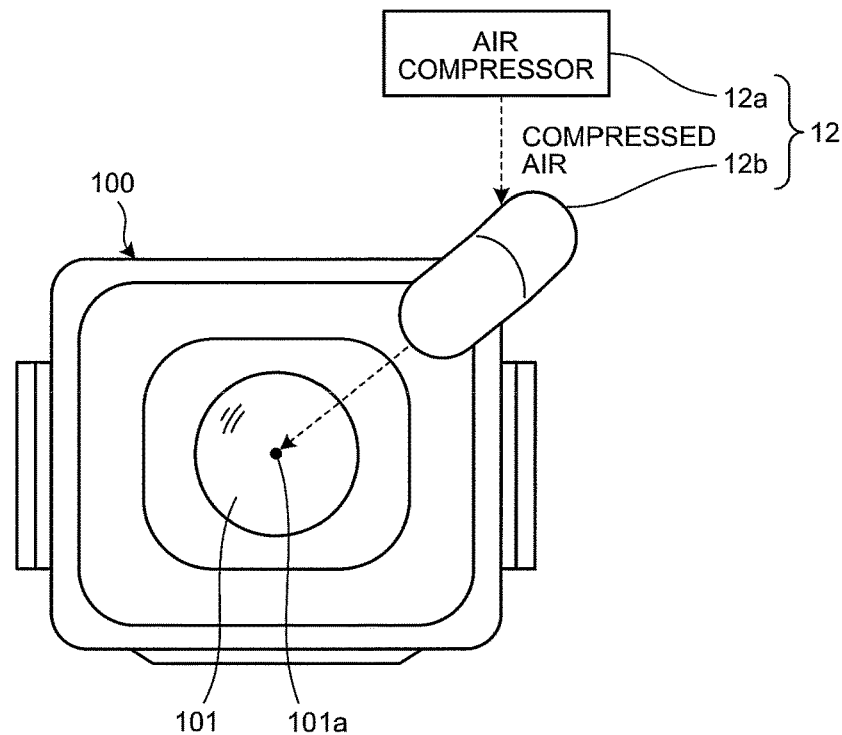
FIG. 3 is a diagram illustrating a specific example of a removing operation to be performed by a removal unit.

FIG. 3 is a diagram illustrating a specific example of the removing operation to be performed by the removal unit 12.

As illustrated in FIG. 3, the removal unit 12 includes an air compressor 12a and a nozzle 12b. When the above removal signal Sr is input from the detector 11, the air compressor 12a compresses air and ejects the compressed air to the nozzle 12b.

The nozzle 12b is arranged so that its ejection direction is toward a center point 61a of the lens 61 from diagonally above the lens 61, for example. The nozzle 12b ejects the compressed air generated by the air compressor 12a to the center point 61a of the lens 61 so as to remove an extraneous matter attached to the lens 61.

In this manner, the removal unit 12 ejects compressed air to remove an extraneous matter. Therefore, the removal unit 12 is able to be provided regardless of a kind and a shape of the camera 60. The removal unit 12 may eject, instead of compressed air, liquid such as water and washing liquid so as to remove an extraneous matter.

The removing operation performed by the removal unit 12 illustrated in FIG. 3 is merely one example, not limited thereto. For example, the removal unit 12 may wipe a surface of the lens 61 by using a camera wiper to remove an extraneous matter.

Figure 4:
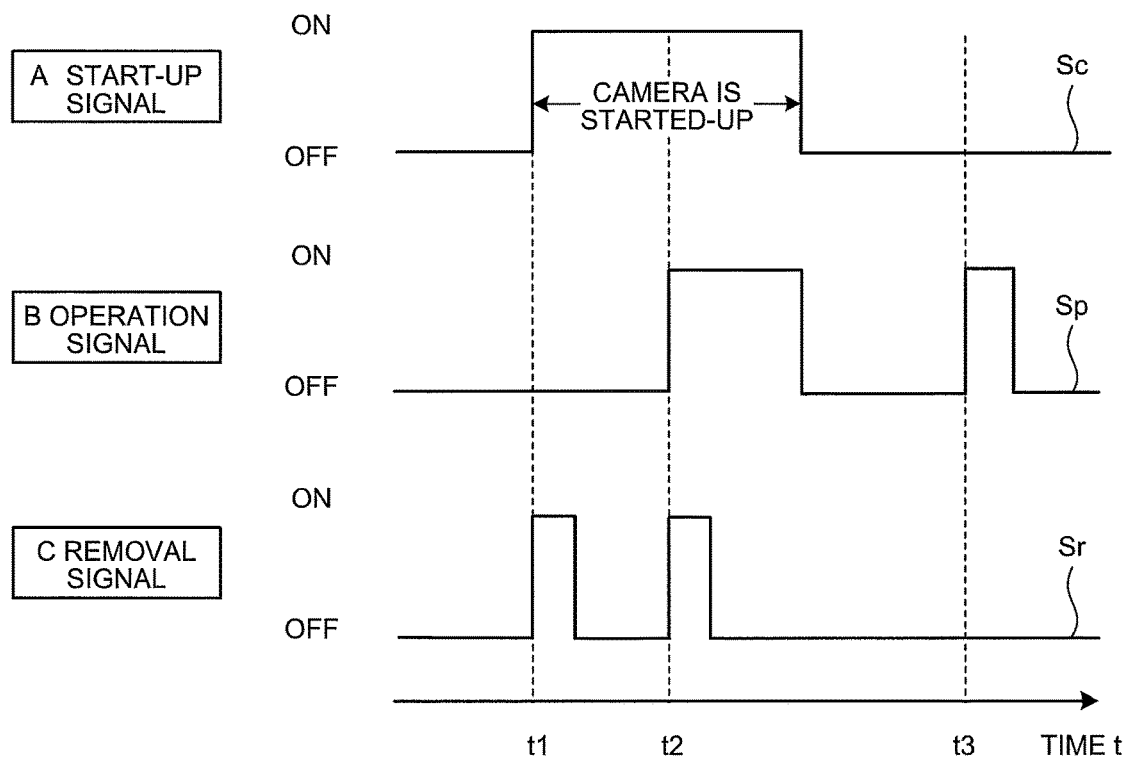
FIG. 4 is a diagram illustrating a detecting process to be executed by a detector.

Next, details of a detecting process to be executed by the detector 11 will be explained with reference to FIG. 4. FIG. 4 is a diagram illustrating the detecting process to be executed by the detector 11. The lateral axis illustrated in FIG. 4 indicates the elapsed time.

"A" illustrated in FIG. 4 indicates an ON/OFF state of the start-up signal Sc, and "B" illustrated in FIG. 4 indicates an ON/OFF state of the operation signal Sp. "C" illustrated in FIG. 4 indicates an ON/OFF state of the removal signal Sr to be output to the removal unit 12 by the detector 11.

As indicated by "A" illustrated in FIG. 4, when the start-up signal Sc is turned into ON from OFF at a time point t1, for example, the detector 11 detects rising in the start-up signal Sc, and, as indicated by "C" illustrated in FIG. 4, the removal signal Sr is turned into ON from OFF.

At the time point t1, the removal unit 12 performs an operation for removing an extraneous matter. Thus, the removing operation is performed before start of the camera 60, and thus a clear image after the extraneous matter is removed, which is captured by the camera 60, is to be displayed on the display 50 illustrated in FIG. 1. Therefore, it is possible to improve convenience of a user.

When detecting the operation signal Sp, the detector 11 turns ON the removal signal Sr in an interval during which the start-up signal Sc is ON, in other words, an interval during which the camera 60 is started up, for example.

In the example illustrated in FIG. 4, the start-up signal Sc and the operation signal Sp are turned ON in an interval from a time point t2 to a time point t3, the detector 11 is able to detect the start-up signal Sc and the operation signal Sp in the interval.

As indicated by "C" illustrated in FIG. 4, the detector 11 turns ON the removal signal Sr at the time point t2. Thus, the removal unit 12 is to perform the removing operation at the time point t2.

In other words, a user is able to turn ON a switch of the rear wiper 105 in an interval during which the camera 60 is started up, and thus it is possible to instruct the extraneous-matter removing apparatus 1 to perform the removing operation at an arbitrarily timing.

Thus, an extraneous matter attached to the camera 60 is able to be removed when the removing operation performed at the time point t1 does not completely remove an extraneous matter, or after the time point t1.

As indicated by an interval after the time point t3 illustrated in FIG. 4, for example, when the operation signal Sp is ON in an interval (for example, interval during which the start-up signal Sc is OFF) during which the camera 60 is not started up, the detector 11 holds the removal signal Sr to be OFF.

This is because, as described above, the extraneous-matter removing apparatus 1 performs the removing operation at a timing of start of the camera 60. In other words, the extraneous-matter removing apparatus 1 performs the removing operation at a timing of start of the camera 60, and thus the removing operation in an interval (interval during which the start-up signal Sc is OFF) during which the camera 60 is stopped is able to be omitted.

Thus, the extraneous-matter removing apparatus 1 does not uselessly perform the removing operation, and thus it is possible to reduce power consumption in performing the removing operation. When detecting the operation signal Sp, the detector 11 may turn ON the removal signal Sr regardless of the start-up signal Sc.

In this case, the number of operations for removing an extraneous matter is larger than that of the above example, and thus it is possible to remove the extraneous matter more reliably.

The case has explained in which the extraneous-matter removing apparatus 1 detects the operation signal Sp for the rear wiper 105 because the camera 60 illustrated in FIG. 2 is a back camera, however, when the camera 60 is a front camera, the extraneous-matter removing apparatus 1 may detect the operation signal Sp for a front wiper so as to perform the removing operation.

When the removal signal Sr is turned ON, the removal unit 12 performs, for example, the removing operation once, however, the removal unit 12 may perform the removing operation more than once (for example, two to three times). When the removal unit 12 performs the removing operation more than once, it is possible to remove an extraneous matter more reliably.

A situation is supposed in which, when the rear wiper 105 operates, a droplet is likely to adhere to the camera 60 in rainy weather etc., for example. Therefore, for example, the removing operation may be performed once when only the start-up signal Sc is detected, moreover the removing operation may be performed more than once when the operation signal Sp is detected along with the start-up signal Sc, namely the number of operation times of the removing operation is able to be set arbitrarily.

Figure 5:
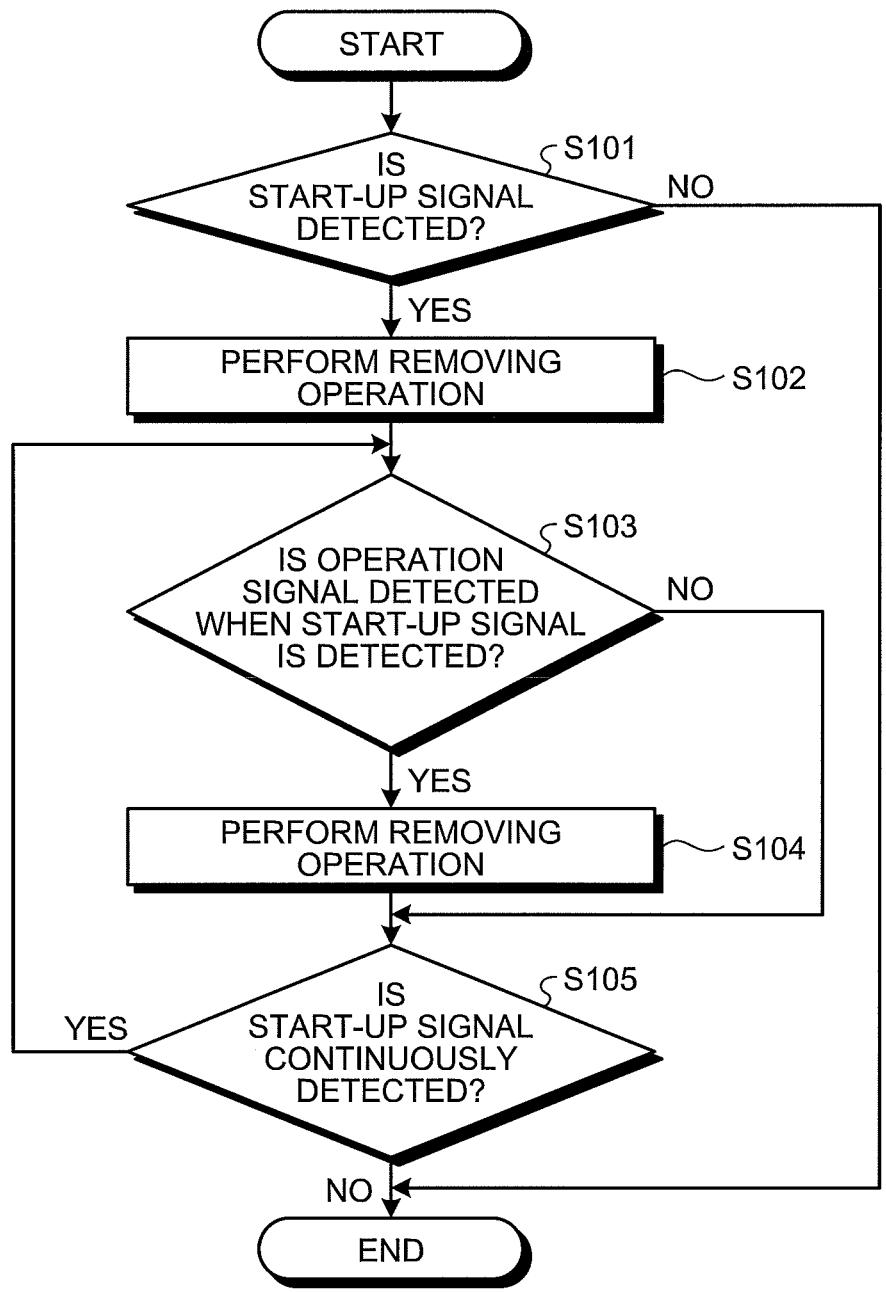
FIG. 5 is a flowchart illustrating a procedure for processes to be executed by the extraneous-matter removing apparatus according to the first embodiment.

Next, a procedure for processes to be executed by the extraneous-matter removing apparatus 1 according to the first embodiment will be explained with reference to FIG. 5. FIG. 5 is a flowchart illustrating the procedure for processes to be executed by the extraneous-matter removing apparatus 1 according to the first embodiment.

As illustrated in FIG. 5, first, the extraneous-matter removing apparatus 1 determines whether or not the start-up signal Sc for the camera 60 is detected (Step S101). When detecting the start-up signal Sc is (Step S101: Yes), the extraneous-matter removing apparatus 1 performs the removing operation (Step S102).

Next, the extraneous-matter removing apparatus 1 determines whether or not the operation signal Sp is detected when the start-up signal Sc is detected (Step S103). When detecting the operation signal Sp in a case where the start-up signal Sc is detected (Step S103: Yes), the extraneous-matter removing apparatus 1 performs the removing operation again (Step S104).

Next, the extraneous-matter removing apparatus 1 determines whether or not the start-up signal Sc is continuously detected (Step S105). In this determination, when not continuously detecting the start-up signal Sc (Step S105: No), the extraneous-matter removing apparatus 1 terminates the process.

On the other hand, when not detecting the start-up signal Sc in the determination of Step S101 (Step S101: No), the extraneous-matter removing apparatus 1 terminates the process. When not detecting the operation signal Sp in the determination of Step S103 (Step S103: No), the extraneous-matter removing apparatus 1 omits Step S104 so as to execute a process of Step S105.

When continuously detecting the start-up signal Sc in the determination of Step S105 (Step S105: Yes), the extraneous-matter removing apparatus 1 repeatedly executes the processes of Step S103 and the following.

As described above, the extraneous-matter removing apparatus 1 according to the first embodiment includes the connector 10, the detector 11, and the removal unit 12. The connector 10 is connected with a branch wire (the camera branch wire Lc2) branching from the camera wire Lc. The camera wire Lc transmits the start-up signal Sc for starting up the camera 60 provided outside of the vehicle 100. The detector 11 detects the start-up signal Sc flowing through the branch wire (the camera branch wire Lc2) connected with the connector 10. The removal unit 12 performs, when the detector 11 detects the start-up signal Sc, a removing operation of an extraneous matter attached to the camera 60. Therefore, by employing the extraneous-matter removing apparatus 1, it is possible to improve convenience of the user.

As described above, the extraneous-matter removing apparatus 1 is able to be operated by using a wire preliminary wired in the back door of the vehicle 100. Therefore, a wiring operation for wiring a new wire in the back door is able to be omitted in installing the extraneous-matter removing apparatus 1. Therefore, it is possible to shorten working hours for the installation and to cut the installation cost.

Second Embodiment

Meanwhile, in the above first embodiment, the case has been explained in which the extraneous-matter removing apparatus 1 detects the start-up signal Sc for the camera 60 and the operation signal Sp for the rear wiper 105 so as to perform the removing operation, not limited thereto. In other words, the removing operation may be performed by detecting another signal.

Therefore, in a second embodiment, a case will be explained in which the removing operation is performed in response to an instruction signal input from the display 50. In the following description, parts similar to those having already been explained are presented with the same reference symbols and duplicated description is appropriately omitted.

Figure 6:
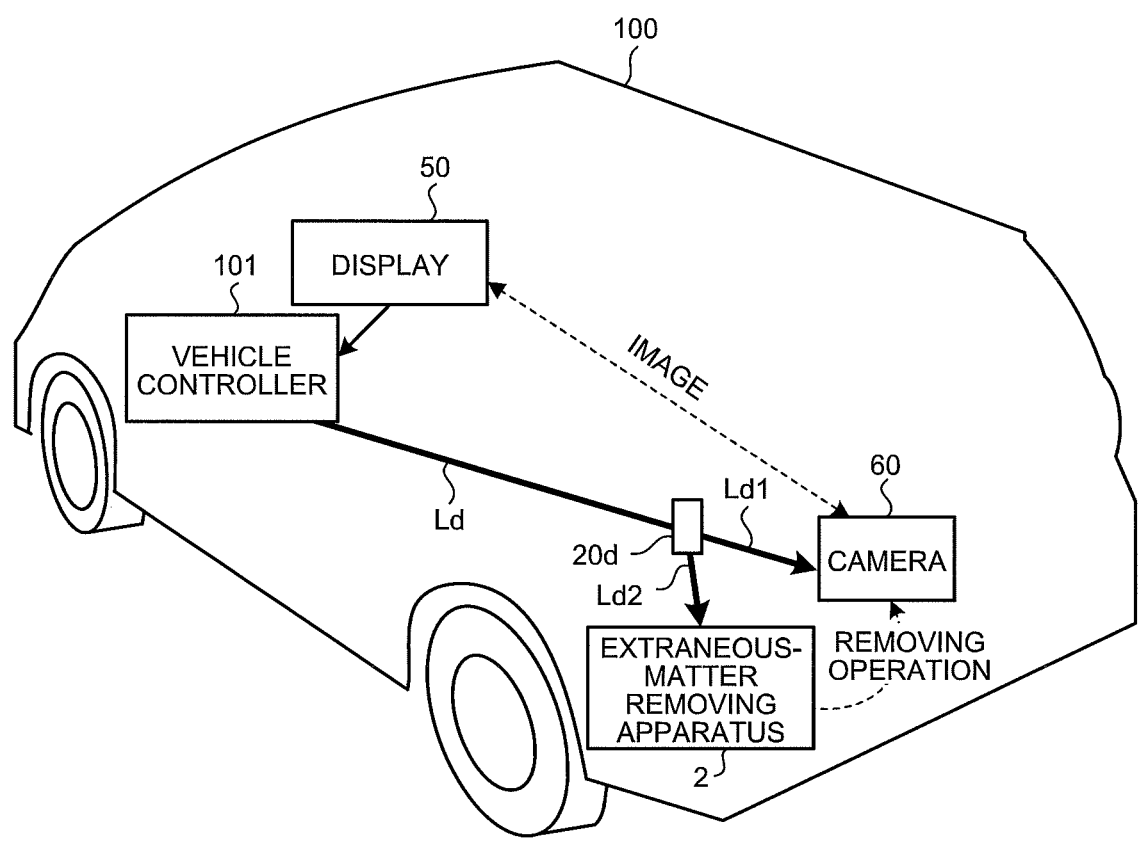
FIG. 6 is a diagram illustrating the outline of an extraneous-matter removing apparatus according to a second embodiment.

First, the outline of the vehicle 100 in which an extraneous-matter removing apparatus 2 according to a second embodiment is provided will be explained with reference to FIG. 6. FIG. 6 is a diagram illustrating the outline of the extraneous-matter removing apparatus 2 according to the second embodiment.

As illustrated in FIG. 6, the vehicle 100 includes a connection wire Ld that connects the vehicle controller 101 and a connector 20*d* in the back door. The connection wire Ld is a camera pre-wire arranged in manufacturing the vehicle 100, for example.

The extraneous-matter removing apparatus 2 according to the second embodiment is connected with a branch connecting wire Ld2 that branches from the connection wire Ld in the connector 20*d*. The connection wire Ld includes the above power-supply wire Le and signal wire.

In other words, the connection wire Ld is able to transmit electric power supplied from a battery (not illustrated) in addition to the start-up signal Sc of the above camera 60, which are sent from the vehicle controller 101.

When acquiring, from the display 50, an instruction performed by a user for removal start, the vehicle controller 101 is able to output, caused by this instruction, an instruction signal for the removing operation through a signal wire of the connection wire Ld, for example.

In other words, by employing the connection wire Ld, the vehicle controller 101 is able to transmit power and an instruction signal to the extraneous-matter removing apparatus 2. Therefore, the vehicle controller 101 is able to transmit an instruction performed by a user for removal start to the extraneous-matter removing apparatus 2.

Figure 7:
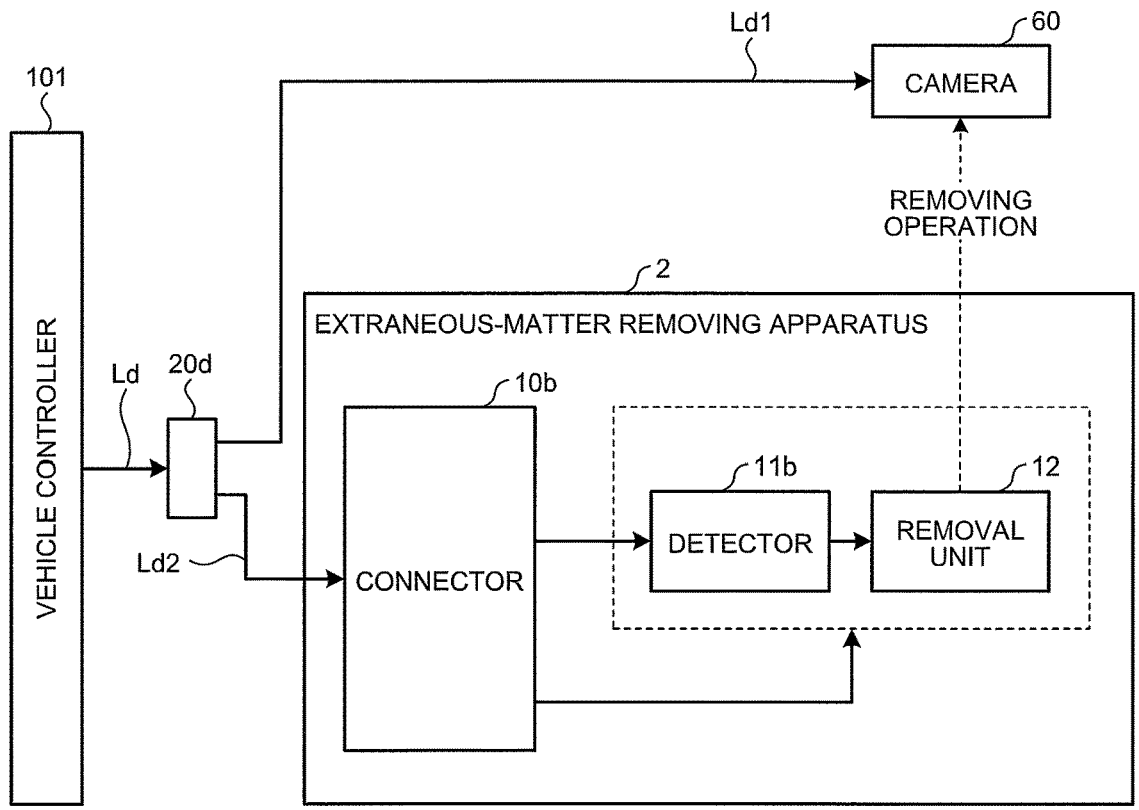
FIG. 7 is a block diagram illustrating the extraneous-matter removing apparatus according to the second embodiment.

Next, a configuration of the extraneous-matter removing apparatus 2 according to the second embodiment will be explained with reference to FIG. 7. FIG. 7 is a block diagram illustrating the extraneous-matter removing apparatus 2 according to the second embodiment.

Wires connected to the extraneous-matter removing apparatus 2 illustrated in FIG. 7 are different from those connected to the extraneous-matter removing apparatus 1 illustrated in FIG. 2. The removal unit 12 and the camera 60 are already explained, and thus explanation thereof is appropriately omitted.

As illustrated in FIG. 7, a branch connecting wire Ld1 and the branch connecting wire Ld2, which are branching from the connection wire Ld wired from the vehicle controller 101 in the connector 20*d*, are respectively connected with the camera 60 and the extraneous-matter removing apparatus 2.

Thus, it is sufficient that the branch connecting wire Ld2 is connected from the one connector 20*d*, and thus installation of the extraneous-matter removing apparatus 2 according to the second embodiment becomes easier.

A connector 10*b* transmits the start-up signal Sc, which is flowing into the branch connecting wire Ld2, and an instruction signal, which is to be mentioned later, to a detector 11*b* as they are. The connector 10*b* supplies electric power supplied from the vehicle controller 101 to the detector 11*b* and the removal unit 12.

In the second embodiment, the vehicle controller 101 is able to always supply electric power to the camera 60. Therefore, the vehicle controller 101 is not to output operation electric power as the start-up signal Sc. Therefore, the start-up signal Sc according to the second embodiment includes a signal for instructing the camera 60 to start capturing, for example.

The detector 11*b* according to the second embodiment detects the start-up signal Sc of the above camera 60 flowing into the branch connecting wire Ld2 and an instruction signal indicating an instruction performed by a user for removal start.

When detecting the start-up signal Sc similarly to the case of the first embodiment, the detector 11*b* generates the removal signal Sr and outputs the generated removal signal Sr to the removal unit 12. When detecting an instruction signal flowing into the branch connecting wire Ld2, the detector 11*b* generates the removal signal Sr and outputs the generated removal signal Sr to the removal unit 12. Details of this instruction signal will be mentioned later with reference to FIG. 8.

In FIG. 7, illustration of the rear wiper 105 illustrated in FIG. 2 is omitted, however, the extraneous-matter removing apparatus 2 may acquire the operation signal Sp for the rear wiper 105 from the vehicle controller 101 so as to perform the removing operation.

Figure 8:
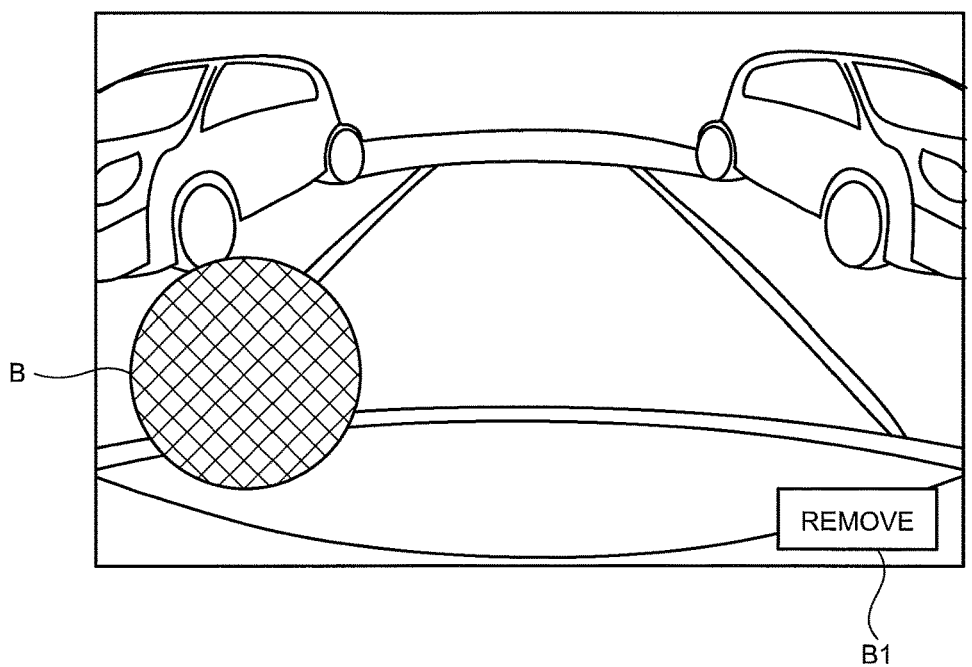
FIG. 8 is a diagram illustrating one example of a user operation.

Next, one example of a user operation will be explained with reference to FIG. 8. FIG. 8 is a diagram illustrating a specific example of a user operation. In FIG. 8, the case is illustrated in which a captured image captured by the camera 60 is displayed on the display 50.

As illustrated in FIG. 8, a remove button B1 is displayed on the display 50 in addition to a captured image captured by the camera 60, for example. Moreover, a case is illustrated in which an extraneous matter B attached to the lens 61 is displayed in the captured image.

In this case, when recognizing the extraneous matter B in this captured image, a user depresses the remove button B1, and then the display 50 outputs, caused by this depression, an instruction signal to the connection wire Ld through the vehicle controller 101, for example.

The instruction signal also flows into the branch connecting wire Ld2, and thus the detector 11*b* detects this instruction signal. When detecting the instruction signal, the detector 11*b* generates the removal signal Sr and outputs the generated removal signal Sr to the removal unit 12.

In other words, the extraneous-matter removing apparatus 2 according to the second embodiment is able to perform the removing operation caused by an instruction performed by a user for removal start. Thus, it is possible to improve convenience of a user.

Each of the above arrangement and display mode of the remove button B1 is merely one example, and not limited thereto. Moreover, the user operation is not limited to depression of the remove button B1.

For example, the vehicle controller 101 may output an instruction signal on the basis of a gesture or a voice of a driver through a camera for capturing a driver or a microphone for collecting sounds in the vehicle 100.

Figure 9:
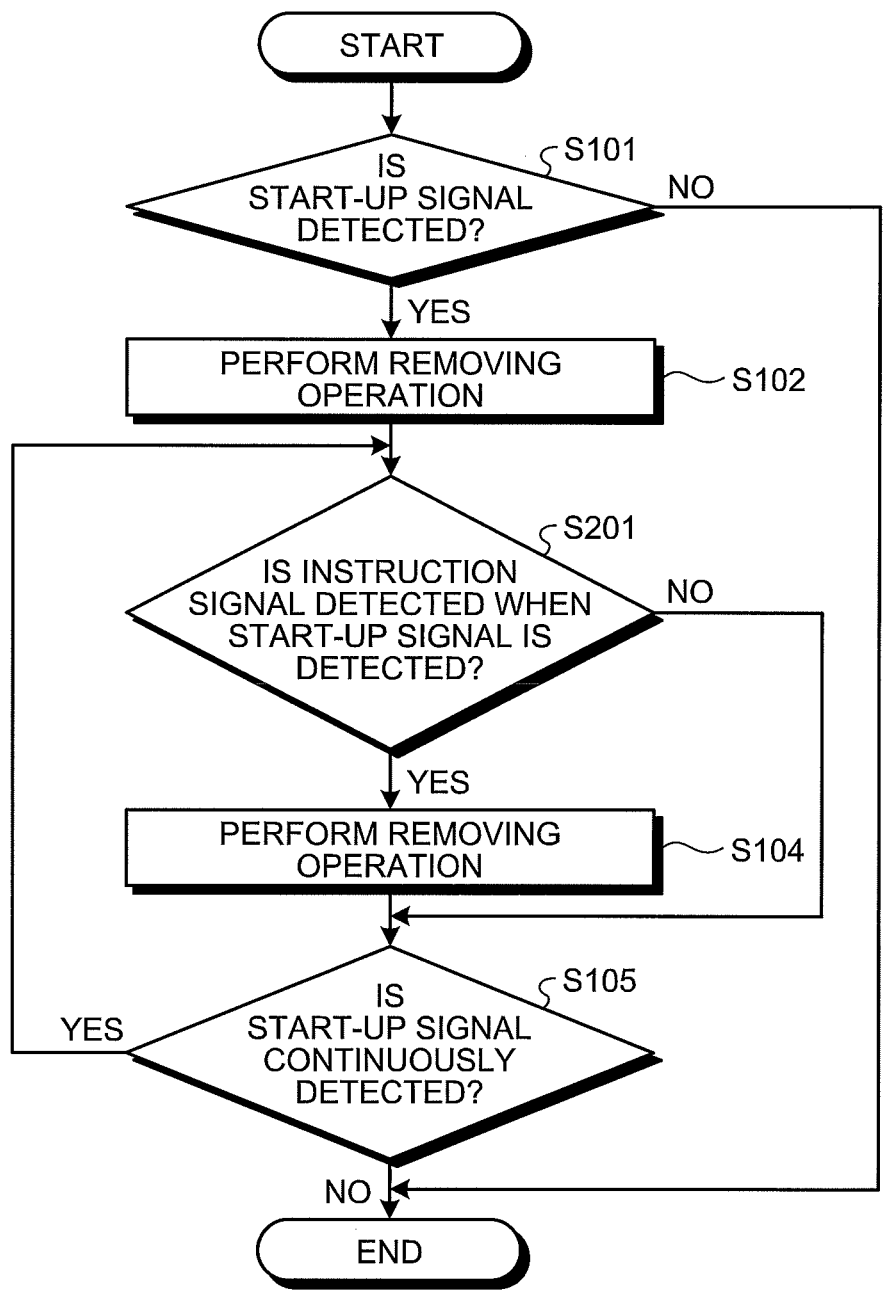
FIG. 9 is a flowchart illustrating a procedure for processes to be executed by the extraneous-matter removing apparatus according to the second embodiment.

Next, a procedure for processes to be executed by the extraneous-matter removing apparatus 2 according to the second embodiment will be explained with reference to FIG. 9. FIG. 9 is a flowchart illustrating a procedure for processes to be executed by the extraneous-matter removing apparatus 2 according to the second embodiment. Steps other than Step S201 have already been explained with reference to FIG. 5, and thus explanation thereof is omitted.

As illustrated in FIG. 9, the extraneous-matter removing apparatus 2 according to the second embodiment determines whether or not an instruction signal is detected when the start-up signal Sc is detected (Step S201).

In this determination, when detecting an instruction signal (Step S201: Yes), the extraneous-matter removing apparatus 2 performs the removing operation (Step S104). On the other hand, in this determination, when not detecting an instruction signal (Step S201: No), the extraneous-matter removing apparatus 2 omits the process of Step S104 and executes the process of Step S105.

As described above, the extraneous-matter removing apparatus 2 according to the second embodiment detects an instruction signal indicating an instruction performed by a user for removal start and executes the removing operation. Therefore, it is possible to improve convenience of a user.

Third Embodiment

Next, an extraneous-matter removing apparatus 3 according to a third embodiment will be explained. The extraneous-matter removing apparatus 3 according to the third embodiment performs the removing operation on the basis of a traveling state of the vehicle 100, for example, so as to effectively remove an extraneous matter attached to the lens 61.

Figure 10:
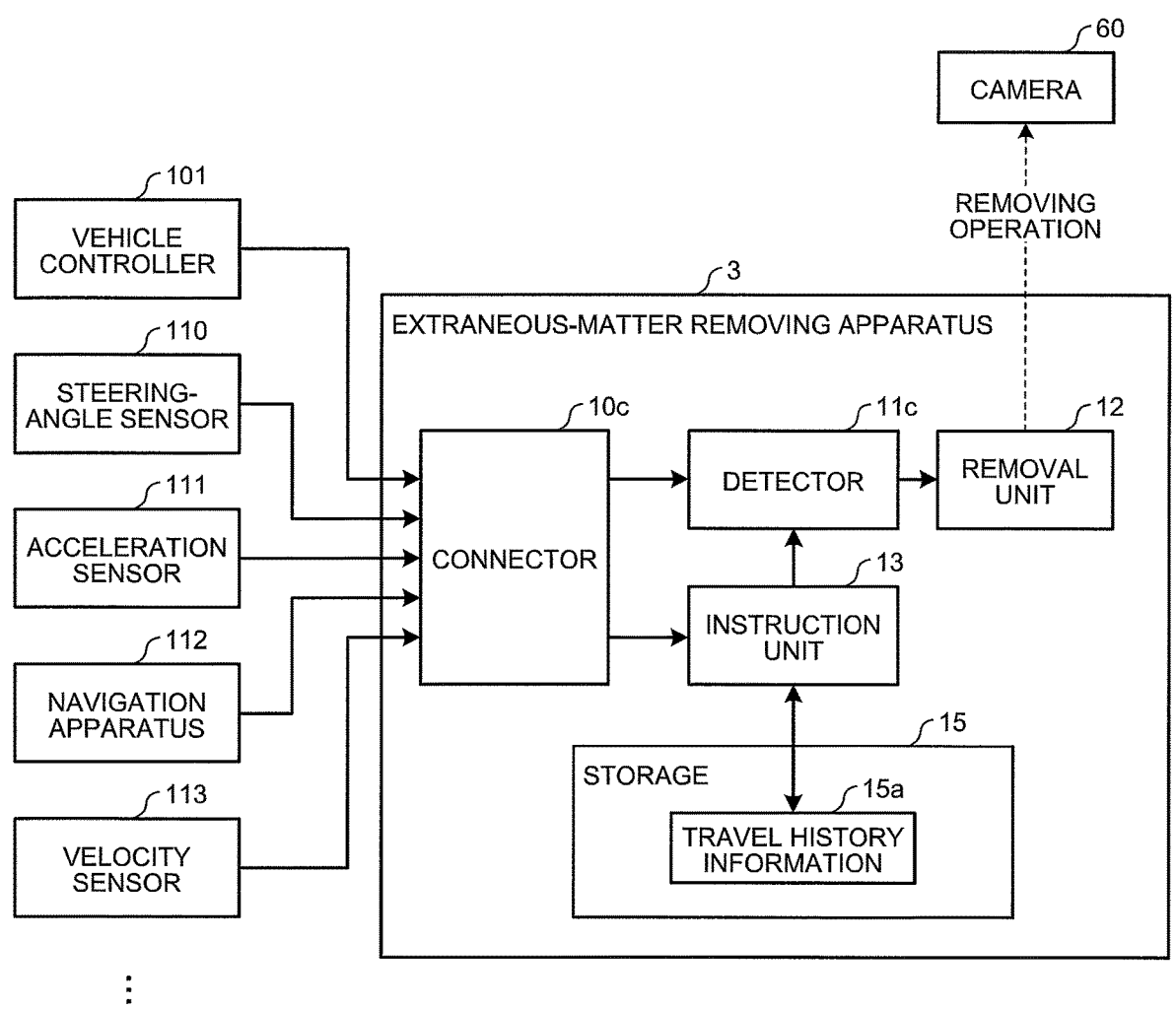
FIG. 10 is a block diagram illustrating an extraneous-matter removing apparatus according to a third embodiment.

First, a configuration of the extraneous-matter removing apparatus 3 according to the third embodiment will be explained with reference to FIG. 10. FIG. 10 is a block diagram illustrating the extraneous-matter removing apparatus 3 according to the third embodiment.

As illustrated in FIG. 10, the extraneous-matter removing apparatus 3 is connected with, in addition to the vehicle controller 101, a steering-angle sensor 110, an acceleration sensor 111, a navigation apparatus 112, a velocity sensor 113, etc. (hereinafter, may be collectively referred to as "on-vehicle devices").

The extraneous-matter removing apparatus 3 according to the third embodiment includes an instruction unit 13 and a storage 15 in addition to the configurations of the extraneous-matter removing apparatuses 1 and 2 illustrated in FIGS. 2 and 7.

A connector 10c is connected with the on-vehicle devices, and transmits a signal input from any of these on-vehicle devices to a detector 11c and the instruction unit 13. When detecting the start-up signal Sc for the above camera 60, the detector 11c generates the removal signal Sr and outputs the generated removal signal Sr to the removal unit 12. Moreover, the detector 11c is able to generate the removal signal Sr in response to an instruction input from the instruction unit 13.

The instruction unit 13 instructs the detector 11c to generate the removal signal Sr, on the basis of a signal input from the above on-vehicle devices through the connector 10c. When a value of an acceleration signal input from an acceleration sensor 111 is equal to or more than a predetermined value, the instruction unit 13 outputs, to the detector 11c, an instruction signal for instructing the detector 11c to generate the removal signal Sr, for example.

This is because, in a situation (for example, rapid deceleration, rapid acceleration, etc.) where the acceleration is applied to the camera 60, a droplet attached to the lens 61 is easily separated from the lens 61.

In other words, in a situation where the acceleration is applied to the camera 60, the extraneous-matter removing apparatus 3 according to the third embodiment is able to effectively remove an extraneous matter by performing the removing operation.

For the same reason, when a steering-angle signal input from a steering-angle sensor 110 is equal to or more than a predetermined value and a velocity signal input from the velocity sensor 113 is equal to or more than a predetermined value, the instruction unit 13 is able to output an instruction signal of the removal signal Sr to the detector 11c. This is because, in this case, the centrifugal force, instead of the acceleration, is applied to the camera 60.

For the same reason, the extraneous-matter removing apparatus 3 may detect vibration caused by, for example, travel of the vehicle 100 so as to perform the removing operation. Thus, the removing operation is able to be performed even when the start-up signal Sc is not detected.

As described above, an image captured by the camera 60 is displayed on the display 50 when the vehicle 100 retracts, in other words, the vehicle 100 is going to park, for example. Therefore, the instruction unit 13 may generate, with reference to position information or nearby map information input from the navigation apparatus 112, the instruction signal when the present position is close to a parking area.

Meanwhile, when the lens 61 of the camera 60 is a convex lens, there exists a case where a droplet attached to an edge part of the lens 61 is not completely removed by the one removing operation. The image corresponding to this edge part, which is captured by the camera 60, is important in preventing an entanglement accident for a driver when the vehicle 100 turns etc.

Therefore, when a steering-angle signal input from the steering-angle sensor 110 is equal to or more than a predetermined value, the instruction unit 13 may output, to the removal unit 12, an instruction signal for instructing to generate the removal signal Sr corresponding to the plurality of removing operations. Thus, an extraneous matter is able to be removed more reliably, so that it is possible to improve convenience of a user.

The instruction unit 13 stores, in the storage 15, signals and information input from the on-vehicle devices as travel history information 15a. The travel history information 15a includes, for example, position information of the vehicle 100, map information, operation situation of the wiper, the traveling velocity, and steering angle information.

When the start-up signal Sc for the camera 60 is input from the vehicle controller 101, the instruction unit 13 refers the travel history information 15a within a prescribed time interval (for example, within 15 minutes).

The instruction unit 13 is able to order, on the basis of the travel history information 15a, the number of the removing operations. For example, when the velocity signal exceeds a predetermined value in a situation where the wiper operates in a prescribed time interval, the instruction unit 13 outputs, to the removal unit 12, an instruction signal for instructing to generate the removal signal Sr corresponding to the plurality of removing operations.

This is because the weather is supposed to be rain when the wiper operates, water on a road is more easily splashed when the traveling velocity of the vehicle 100 is large than the case where the traveling velocity of the vehicle 100 is small.

Therefore, in this case, an extraneous matter is supposed to be attached to the lens 61. Thus, when the removing operation is performed at a plurality of times, the extraneous matter is removed more reliably.

The instruction unit 13 may generate an instruction signal for ordering the number of the removing operations on the basis of, instead of the velocity signal, information on roads on which the vehicle 100 traveled. For example, when the vehicle 100 has traveled on an expressway or a bypass during a prescribed time interval, the instruction unit 13 is also able to order the plurality of removing operations. When the vehicle 100 has traveled a non-surfaced road such as a country road, the plurality of removing operations may be also ordered.

For example, the instruction unit 13 may acquire weather information from the navigation apparatus 112, when the weather of an area is rain in which the vehicle 100 travelled during a prescribed time interval, the instruction unit 13 may order the plurality of removing operations.

The storage 15 is a storage device such as a non-volatile memory and a hard disk drive so as to store the above travel history information 15a. The extraneous-matter removing apparatus 3 may acquire the travel history information 15a through another computer or a portable recording medium connected with a wired or wireless network.

The on-vehicle devices illustrated in FIG. 10 are merely one example, not limited thereto. For example, the extraneous-matter removing apparatus 3 may be connected with an extraneous-matter detecting apparatus for detecting an extraneous matter attached to the lens 61, and may perform the removing operation caused by the instruction from this extraneous-matter detecting apparatus.

Figure 11:
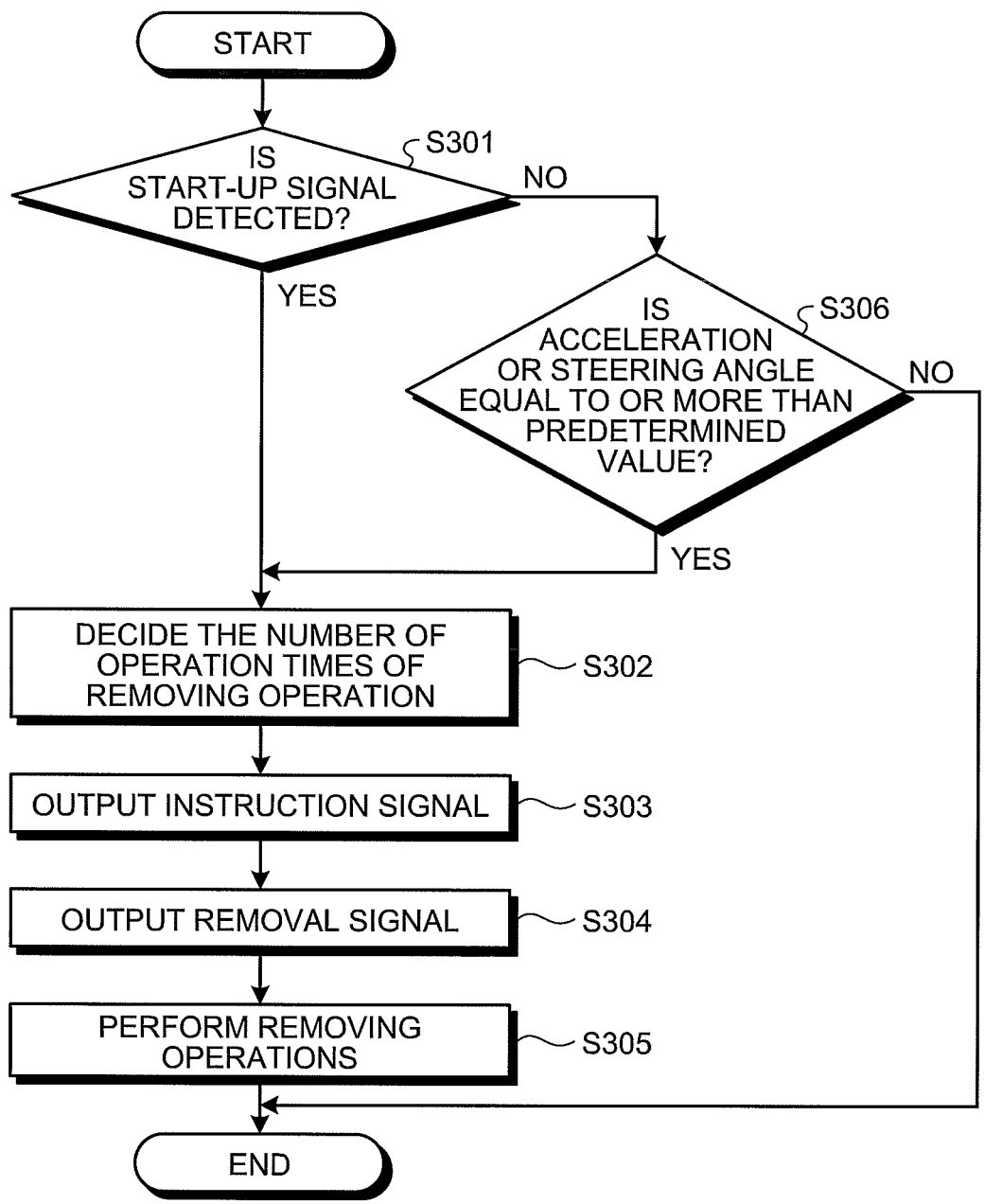
FIG. 11 is a flowchart illustrating a procedure for processes to be executed by the extraneous-matter removing apparatus according to the third embodiment.

Next, a procedure for processes to be executed by the extraneous-matter removing apparatus 3 according to the third embodiment will be explained with reference to FIG. 11. FIG. 11 is a flowchart illustrating a procedure for processes to be executed by the extraneous-matter removing apparatus 3 according to the third embodiment.

As illustrated in FIG. 11, first, the extraneous-matter removing apparatus 3 determines whether or not the start-up signal Sc is detected (Step S301). When detecting the start-up signal Sc (Step S301: Yes), the extraneous-matter removing apparatus 3 decides the number of operation times of the removing operation on the basis of the travel history information 15a (Step S302).

Next, the extraneous-matter removing apparatus 3 outputs an instruction signal for specifying the number of operation times (Step S303), and outputs the removal signal Sr according to this number of operation times (Step S304).

The extraneous-matter removing apparatus 3 performs the removing operations having this number of operation times (Step S305). On the other hand, when the start-up signal Sc is not detected in the determination of Step S301 (Step S301: No), the extraneous-matter removing apparatus 3 determines whether or not the acceleration or the steering angle is equal to or more than a predetermined value (Step S306).

When the acceleration or the steering angle is equal to or more than the predetermined value in this determination (Step S306: Yes), the extraneous-matter removing apparatus 3 executes the processes of Step S302 and the following.

On the other hand, when any of the acceleration and the steering angle is less than the predetermined value in the determination (Step S306: No), the extraneous-matter removing apparatus 3 does not perform the removing operation and terminates the process.

As described above, the extraneous-matter removing apparatus 3 according to the third embodiment performs the removing operation on the basis of a traveling state of the vehicle 100. Therefore, it is possible to improve a removal probability of an extraneous matter attached to the lens 61. Thus, it is possible to improve convenience of a user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An extraneous-matter removing apparatus comprising:
    a connector connected to a first branch wire branching from a camera wire at a first branch connector, the camera wire including a camera branch wire and connecting a vehicle controller to a camera located outside of a vehicle via the first branch connector, the camera wire transmitting a start-up signal to start the camera, and the first branch wire branching from the camera wire at the first branch connector between the vehicle controller and the camera to connect the vehicle controller to the connector of the extraneous-matter removing apparatus; and
    a detector detecting the start-up signal flowing through the first branch wire connected to the connector of the extraneous-matter removing apparatus; and
    a remover that performs, when the detector detects the start-up signal, a removing operation of an extraneous matter attached to the camera.

2. The extraneous-matter removing apparatus according to claim 1, wherein:
    the connector is connected to a second branch wire branching from a wiper wire, the wiper wire connecting the vehicle controller and a wiper configured to wipe a window of the vehicle, the wiper wire transmitting an operation signal for operating the wiper of the vehicle, and the second branch wire branching from the wiper wire at a second branch connector between the vehicle controller and the wiper to connect the vehicle controller and the connector,
    the detector detects the operation signal flowing through the second branch wire connected to the connector, and
    the remover performs the removing operation when the detector detects the operation signal.

3. The extraneous-matter removing apparatus according to claim 2, wherein the remover performs the removing operation when the detector detects the operation signal in an interval during which the camera is started up.

4. The extraneous-matter removing apparatus according to claim 1, wherein:
    the connector is connected with a power-supply wire arranged in a back door, and
    the detector and the remover are operated by power that is supplied from the power-supply wire connected with the connector.

5. The extraneous-matter removing apparatus according to claim 1, wherein the remover performs the removing operation when the detector detects rising in the start-up signal.

6. The extraneous-matter removing apparatus according to claim 1, wherein:
    the connector is connected with a signal wire, the signal wire transmitting an instruction signal indicating an instruction performed by a user for removal start,
    the detector detects the instruction signal flowing through the signal wire, and
    the remover performs the removing operation when the detector detects the instruction signal.

* * * * *